Patented May 11, 1926.

1,584,231

UNITED STATES PATENT OFFICE.

SHICKREY B. KOORY, OF SCHUYLER, NEBRASKA.

COMPOSITION FOR THE REMOVAL OF PAINT AND VARNISH.

No Drawing.   Application filed July 29, 1922.   Serial No. 578,490.

This invention relates to compositions designed for the removal of paint and varnish, and one of the objects of the invention is to provide a paint and varnish remover which, when applied, will render paint or varnish easily removed with a wet cloth or stream of water, thus eliminating the necessity of scraping, sand-papering and refinishing the wood or metal for repainting or revarnishing.

Another object is to provide a remover of this character whose action is almost instantaneous so that the article from which the paint or varnish has been removed may be repainted or revarnished in a very short time.

A further object is to provide a neutralizer designed to be applied immediately when the paint and varnish have been removed which not only neutralizes the solution first used but, when applied to wood, bleaches the wood and brings it back to its natural condition.

The composition which I have devised for this purpose comprises preferably the following ingredients in the following proportions:—

Sodium hydroxide or hydrate or caustic soda (NaOH) ¾ lb., potassium hydroxide, potassium hydrate or caustic potash (KOH) ¼ lb., ammonium hydroxide or ammonium hydrate ¼ lb., ammonium chloride $NH_4Cl$ 2 oz., denatured or wood alcohol 10 oz., water enough to make one gallon of the solution.

This solution may be applied with a cloth, with a fabric brush, or with a paint brush, and in from one-half to five minutes after the solution is applied, the paint or varnish on the article may be wiped or washed off. It is then necessary to neutralize the solution of the paint remover, and to that end I apply to the article a neutralizing solution comprising an acid and water. Preferably I use hydrochloric acid 20 parts and water 80 parts.

I do not wish to confine myself to the exact proportions stated above, as these may be varied in many ways, nor do I wish to be confined to the use either singly or together of sodium, potassium or ammonium hydroxide, hydrate or caustic soda or caustic potash, as any hydrate of an organic or inorganic salt may be used. I have found, however, that the sodium, potassium and ammonium hydrates when combined are more efficient in their action than if the sodium, potassium or ammonium hydrates were used singly. I have found that the combination of these salts makes the hydrate more active. In place of the hydrates of ammonium, sodium or potassium, however, I may use any one or all of the hydrates of calcium, lithium, rubidium or cecium, and it will be seen that the hydrate of any or all of the organic or inorganic salts is the active principle of my composition, I prefer the sodium, potassium and ammonium hydrates because they are more available, not so expensive, and because I have found that by combining these salts the hydrate becomes much more active. These salts combine readily and blend harmoniously, rendering the action of the hydrate more powerful. The ammonium chloride is used to modify combustion and the alcohol to aid penetration and to prevent freezing of the solution in winter.

Neither do I wish to be confined to the use of hydrochloric acid as a neutralizing acid, nor to the exact proportions stated, as these may be varied and any of the acids such as citric, acetic or sulphuric acid may be used to produce the same results. I have found, however, that hydrochloric acid is preferable. The acid solution neutralizes any alkali or neutralizes any paint or varnish removing solution containing alkali. It is to be noted that I do not combine in the paint removing solution an acid and an alkali, as these would tend to neutralize each other but that the paint removing solution is alkaline in character and that after it has been applied and done its work, it is neutralized by the use of the acid solution. In my formula, the active principle or base is a hydrate of an organic or inorganic salt. I am aware that there have been paint removing solutions patented containing a hydrate, but the hydrate does not form the base or active element of the solution but is in a relatively minute amount so that it is absolutely inoperative.

The paint removing composition is liquid, it acts almost instantaneously and must be used with a neutralizing composition such as that disclosed in order that the wood or other material to which the paint removing composition has been applied may be protected and the effects of the paint removing composition neutralized. Any formula containing the above mentioned hydroxide, hydrates, or containing lye, will discolor the wood and will be liable to cause great injury. This, however, is rendered impossible by the immediate use of the neutralizing composition, which acts to neutralize the strong alkali solution, whereby paint or varnish reapplied to the article after the original paint and varnish have been removed may adhere to the metal or wood just as if the paint removing composition had not been used.

I have found by actual experience that the paint removing composition formed in accordance with this specification is extremely effective and that it is particularly advantageous because of the rapidity with which the work may be done. Thus, for instance, experience has shown that the paint and varnish may be removed from an automobile and a start be made in painting the automobile within half a day. I have also found that the neutralizing solution, where the paint remover has been applied to wood, not only acts to neutralize the paint removing composition but bleaches the wood and brings it back to its natural condition.

I claim:—

A paint and varnish remover including a solution composed of the following ingredients in the following proportions, sodium hydroxide, hydrate or caustic soda ($NaOH$) ¾ pound, potassium hydroxide, potassium hydrate or caustic potash ($KOH$) ¼ pound, ammonium hydroxide or ammonium hydrate ¼ pound, ammonium chloride ($NH_4Cl$) 2 ounces, alcohol 10 ounces, and water sufficient to form one gallon of the solution.

In testimony whereof I hereunto affix my signature.

SHICKREY B. KOORY, M. D.